Figure 1:
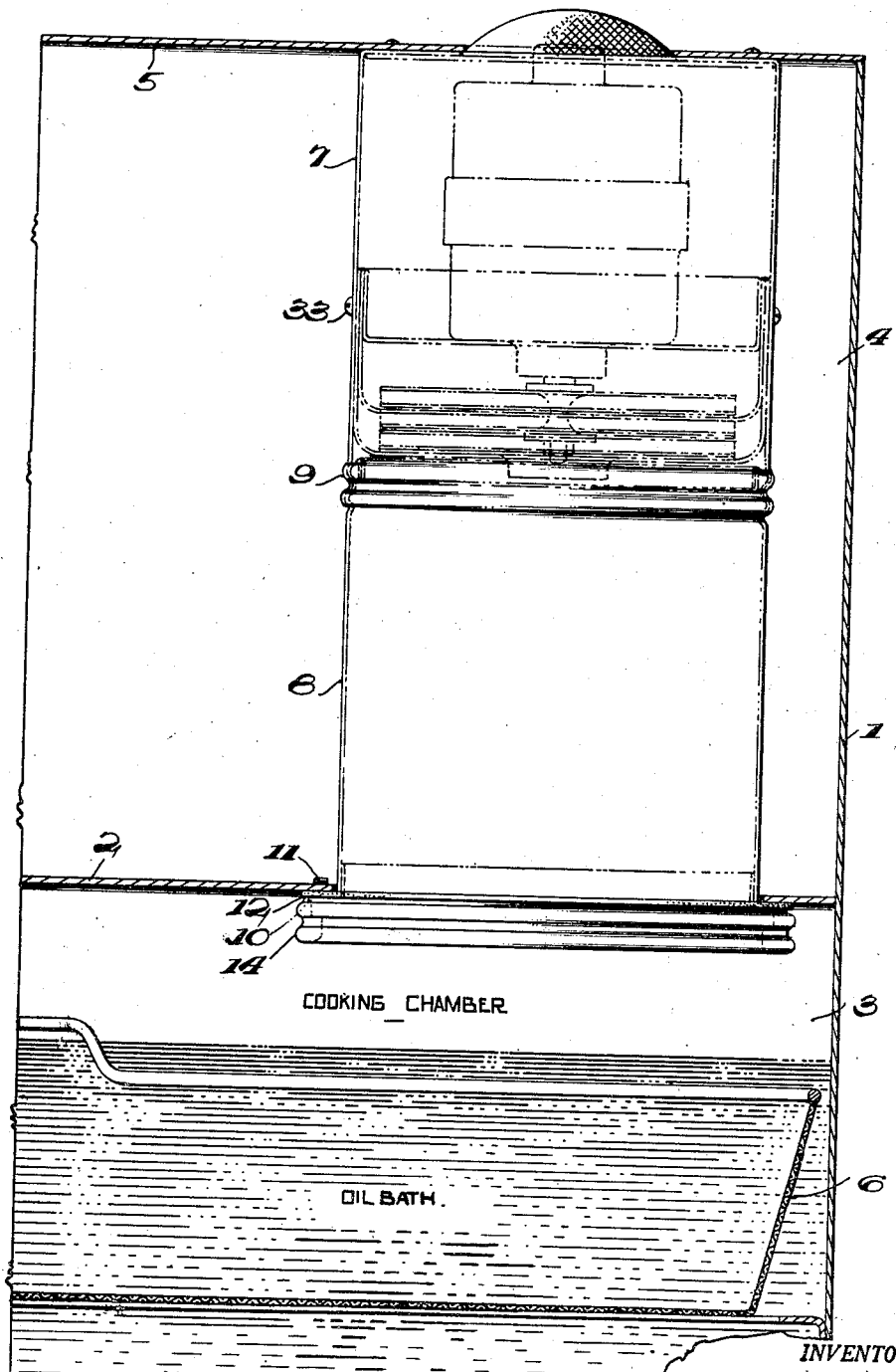

Patented July 31, 1951

2,562,839

UNITED STATES PATENT OFFICE 2,562,839

FILTER UNIT FOR COOKERS

Adolph A. Winston, Elizabeth, N. J., assignor, by mesne assignments, to General Foods Corporation, New York, N. Y., a corporation of Delaware Application July 10, 1946, Serial No. 682,631

1 Claim. (Cl. 183—37)

This invention relates to the prevention of escape of cooking odors from machines for roasting or frying food products in oil or fat.

Many different types of machines have been devised and used for cooking nuts, bakery products such as doughnuts, and like foods in a bath of hot oil or fat, and in many cases such machines have been installed in places exposed to public view in order to promote the sale of the freshly cooked product direct to the ultimate consumer. However, it is difficult to prevent the escape from such machines of cooking odors which may not be offensive or even unpleasant of themselves but in any event are objectionable in crowded public buildings such as stores and the like. The usual ventilation and air conditioning systems have proved inadequate to solve this problem, and the installation of escape ducts from the location of the cooker to the outside of the building is often impracticable and in any case unduly expensive. Such ducting is further undesirable because the cooker once installed is a fixture which cannot be moved without reconstructing the ducting. These factors have prevented the use of such cookers at many otherwise desirable points.

The principal object of the present invention is to eliminate all odors heretofore incident to the operation of such cookers, so that they may be used at any desirable location without objection and moved from place to place as self-contained units independently of external ducting, ventilating equipment, etc.

Another object is to provide a novel and improved self-contained system for ventilating the interior of such a cooker, while at the same time removing all odor from the air discharged to the atmosphere surrounding the cooker.

The invention may be applied to any of the various known types of cookers using a hot fat or oil bath for roasting nuts, frying doughnuts and the like. Thus the cooker may be automatic or non-automatic, may be heated by gas, electricity or otherwise, may comprise a small portable unit for use on a counter or a larger more or less permanent installation, may have a glass or other transparent casing to expose the cooking operation to the customer or an opaque casing of metal or the like, and so on. In any event, however, the cooking operation is performed in a casing which is enclosed except for suitable doors for charging the raw product and withdrawing the cooked product and except for the application of the ventilating system hereinafter described.

The atmosphere in the cooking chamber will contain odorous gases resulting from the cooking of the food itself and also from the degradation of the cooking oil or fat. It will also contain a fine mist of oil or fat particles in which some of the odorous gases are dissolved so that this mist also acts as a carrier for objectionable odors. Air exhausted from the cooker must first be thoroughly cleaned of both forms of odor-carrying impurities if the escape of odors from the cooker is to be prevented.

The odorous gases can be adsorbed on a suitable material such as activated carbon, the air being sucked through the adsorbent by a suitable exhaust fan or the like. However, some of the oil mist is deposited on the adsorbent at the same time so that its effectiveness in adsorbing the gases rapidly decreases, and furthermore some of the odor-carrying oil mist passes through the adsorbent and escapes even though a large excess of adsorbent is used beyond that necessary to remove the odorous gases. In order to prevent entirely the escape of odors from the cooker, the oil mist must be completely removed from the air leaving the cooker by passing the air through a fine oil filter, preferably of oil absorbing material. Furthermore, by placing this filter ahead of the adsorbent in the path of the air being exhausted, contamination of the adsorbent with oil is also prevented so that the odorous gases are effectively removed by adsorption and the life of the adsorbent is extended.

In order to pull the air through a fine oil filter, it is necessary to employ an exhausting device capable of producing relatively high suction, as for example, a fan which will move air against static pressures in the neighborhood of ten to fifteen inches of water. Otherwise the flow of air through the cooker to the exhaust point will be insufficient to ventilate the chamber thoroughly and odor-laden air may escape around the edges of doors or through other outlets. Moreover, in this case there may be objectionable condensation of moisture on the walls of the cooking chamber. The rate at which air must be removed from the cooker to prevent such condensation will vary depending on temperature and humidity conditions, etc., and the suction device may be designed to remove the air rapidly enough to prevent condensation under the most severe operating conditions likely to be encountered, or if desired its operation may be controllable by the operator to suit varying conditions.

One embodiment of the invention has been illustrated in the accompanying drawings but it is to be expressly understood that said drawings are for purposes of illustration only and are not to be construed as a definition of the limits of the invention, reference being had to the appended claim for this purpose.

In the drawings,

Fig. 1 is an elevation, partly in section, showing the application of the invention to a cooker of the type mentioned above; and Fig. 2 is a vertical section through the ventilating and deodorizing means.

The cooker may be of any of the types mentioned above and is shown diagrammatically and in part only. It comprises a suitable casing 1 here shown as divided by a partition 2 into a lower cooking chamber 3 which contains a hot fat or oil bath and an upper chamber 4 enclosed by the top casing wall 5. The articles to be cooked, for example nuts, are immersed in the hot bath for the desired period and then removed by suitable means such as a basket 6 of wire or other perforated material.

As explained above the atmosphere in the cooking chamber 3 contains odorous gases resulting from the cooking of the nuts and from degradation of the hot fat or oil in the bath, as well as an oil mist in which some of these odorous gases are dissolved. This chamber is ventilated and the atmosphere exhausted therefrom to the surrounding atmosphere by means of a ventilating unit extending between and mounted upon the partition 2 and the casing wall 5. Generally speaking, this unit comprises a two-part cylindrical casing the upper part 7 of which is mounted on the top wall 5 and the lower part 8 of which is mounted on the partition 2, the parts having a threaded connection 9. This casing forms a closed duct through which the cooking chamber atmosphere is removed and discharged into the air surrounding the cooker.

Figure 2:
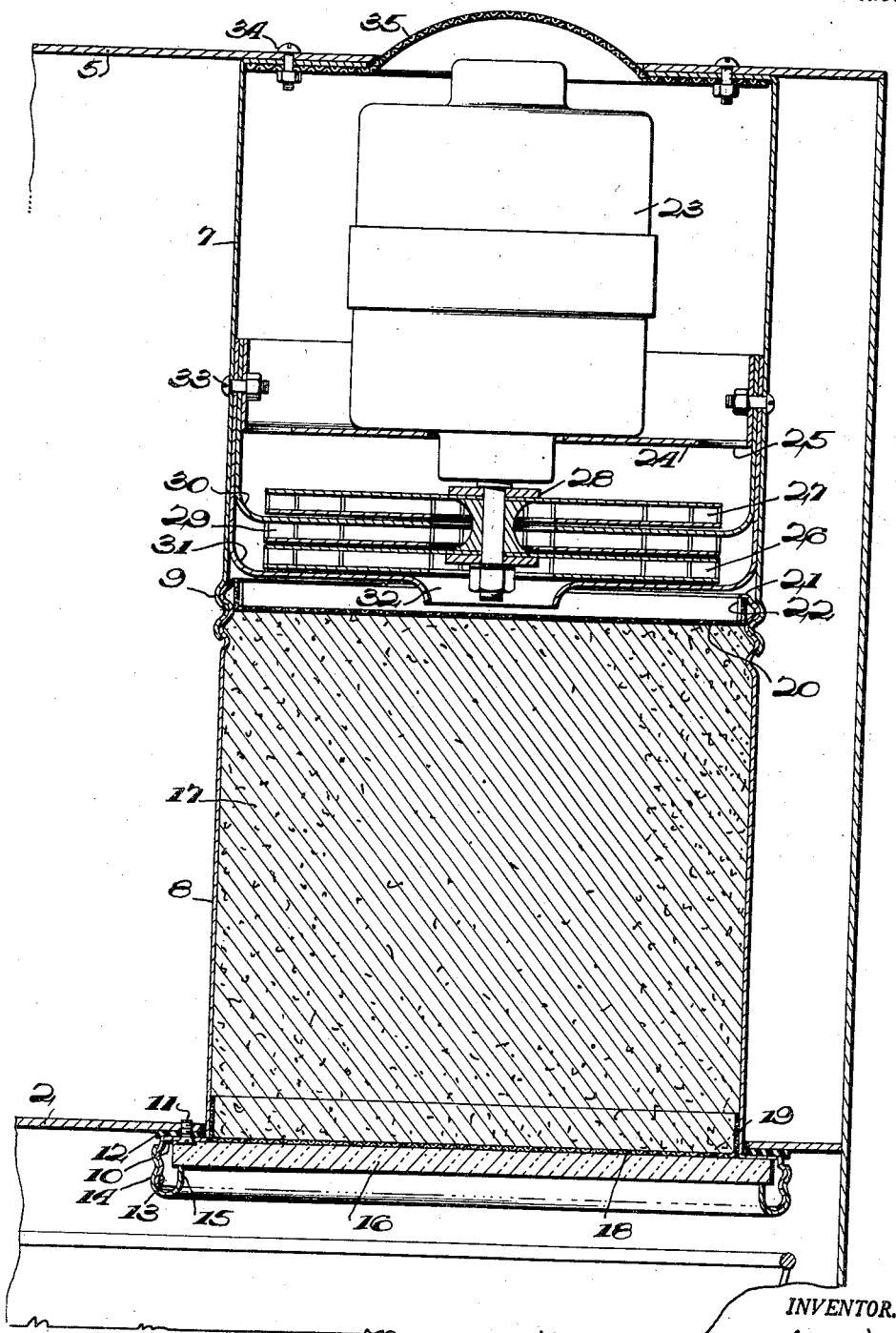

The details of the ventilating unit are shown more clearly in Fig. 2. The lower casing unit 8 extends through an opening in the partition 2 and is provided with a flange 10 below and secured to the partition by suitable means such as screws 11, a sealing gasket 12 being preferably interposed between the flange and the partition. The margin of the flange 10 has a downwardly threaded rim 13 on which a retaining member 14 is screwed, the latter being turned over at 15 inside the rim 13 to support a removable oil filter 16. This filter is a fine oil absorbing filter as described above, for example, an asbestos-paper oil filter pad, a tight filter cloth, or highly compacted steel, glass or asbestos wool, etc. This arrangement permits ready removal and replacement of the filter pad simply by unscrewing the retaining member 14 without disturbing the ventilator unit 7, 8.

Above the filter pad 16 is a bed 17 of adsorbent material such as activated carbon which removes the odorous gases from the atmosphere. This material is suitably supported in the lower casing unit 8 as by means of a wire screen 18 in the bottom of the casing unit and a sheet 19 of muslin or the like covering the wire screen. Material 17 is also prevented from being drawn by suction into the upper casing unit 7 by means of a fabric or metal screen 20 located in the upper end of the lower casing unit under its flanged rim 21 and retained therein by suitable means such as a split ring 22. Due to the threaded connection 9 between the upper and lower casing units, the lower unit can be removed to replace the adsorbent 17 without disturbing the upper unit by removing the screws 11 and unscrewing the lower unit from the upper unit.

The upper casing unit 7 houses a fan assembly of the type mentioned above, i. e., a fan capable of moving air against relatively high static pressures in the neighborhood of 10 to 15 inches of water. In the form shown, this fan assembly comprises an electric motor 23 mounted on a plate 24 which is apertured at 25 to permit passage of air therethrough. The motor drives a two-stage turbine type centrifugal fan comprising rotating impeller sections 26 and 27 carried by the hub 28 on the motor shaft and a stationary intermediate section 29 mounted by means of a support 30. A member 31 closes the bottom of the upper casing unit except for a central opening 32 through which air is drawn from the lower casing unit into the first stage 26 of the impeller. The plate 24, support 30 and member 31 are mounted in the upper casing unit in any suitable manner, being for example more or less cup-shaped and nesting within one another within the casing 7 to which they are all secured by the same bolts 33.

The upper casing unit is secured to the top casing wall 5 in any suitable manner, as by means of bolts 34 which also serve to mount a screen or perforated plate 35 through which the air is exhausted into the surrounding atmosphere.

The operation of the device will be clear from the foregoing description and may be briefly summarized as follows. The suction developed by the fan assembly is sufficient to move air through the oil filter 16 and adsorbent material 17 at a rate sufficient to create a draft through the cooking chamber, thereby preventing escape of the odor-laden atmosphere from the cooking chamber through other outlets and also condensation of moisture on the wall of the cooking chamber. The oil mist containing dissolved odorous gases is completely removed from the atmosphere as it passes through the filter 16 and the adsorbent 17 is protected from contamination with oil at the same time, thereby extending its life and permitting effective removal of the remaining odorous gases by adsorption. Thus clean deodorized air is drawn into the fan assembly and exhausted through the outlet screen 35 to the atmosphere surrounding the cooker.

The construction of the ventilating unit permits the easy removal and replacement of the oil filter and/or of the adsorbent material without disturbing other parts of the unit, while at the same time it provides a completely enclosed duct whereby the atmosphere is withdrawn from the cooking chamber, cleansed and exhausted without possibility of leakage.

Where only one embodiment of the invention has been described and illustrated in the drawings, it will be understood that various changes can be made in the form, details of construction and arrangement of the parts without departing from its spirit. Reference should therefore be had to the appended claim for a definition of the limits of the invention.

What is claimed is:

Means for removing and deodorizing fumes from a cooker of the type wherein food products are roasted or fried in a hot bath of oil or fat comprising a substantially tubular casing formed of tubular members detachably connected together in end-to-end relation and providing a conduit through which said fumes are removed, one of said members comprising a suction unit having therein a centrifugal type suction fan adjacent its inner end and a driving motor for said fan, diaphragm means at the inner end of said suction unit and provided with a central aperture through which fumes are drawn by said fan, the other of said members comprising a filter unit having foraminate retaining members adjacent both ends and being substantially filled with adsorbent material for removing odorous gases from said fumes, said filter unit having laterally projecting means adjacent its outer end for mounting said casing on a cooker and a section extending beyond said means and the outer retaining member, an oil-retaining filter pad inserted in the end of said extending section adjacent said retaining member, and clamping means detachably mounted on said section to engage and hold said pad in place.

ADOLPH A. WINSTON.

REFERENCES CITED

The following references are of record in the file of this patent:

UNITED STATES PATENTS

| Number | Name | Date |
|---|---|---|
| 1,067,693 | Van Calcar et al. | July 15, 1913 |
| 1,231,088 | Stafford et al. | June 26, 1917 |
| 1,267,171 | Bee | May 22, 1918 |
| 1,506,232 | Fleming | Aug. 26, 1924 |
| 1,789,194 | Rockwell | Jan. 13, 1931 |
| 1,789,262 | Monro et al. | Jan. 13, 1931 |
| 1,794,940 | Zimmermann | Mar. 3, 1931 |
| 1,801,506 | Jenks | Apr. 21, 1931 |
| 1,814,936 | Hunter | July 14, 1931 |
| 1,866,659 | Litle | July 12, 1932 |
| 2,181,672 | Sutcliffe et al. | Nov. 28, 1939 |
| 2,207,316 | Ferry | July 9, 1940 |
| 2,243,637 | Landis et al. | May 27, 1941 |
| 2,362,933 | Schaefer | Nov. 14, 1944 |
| 2,369,375 | Sonntag | Feb. 13, 1945 |

FOREIGN PATENTS

| Number | Country | Date |
|---|---|---|
| 295,070 | Great Britain | Aug. 9, 1928 |